March 14, 1933.  G. W. JOHNSTON ET AL  1,901,302
SLED BRAKE
Filed July 20, 1931
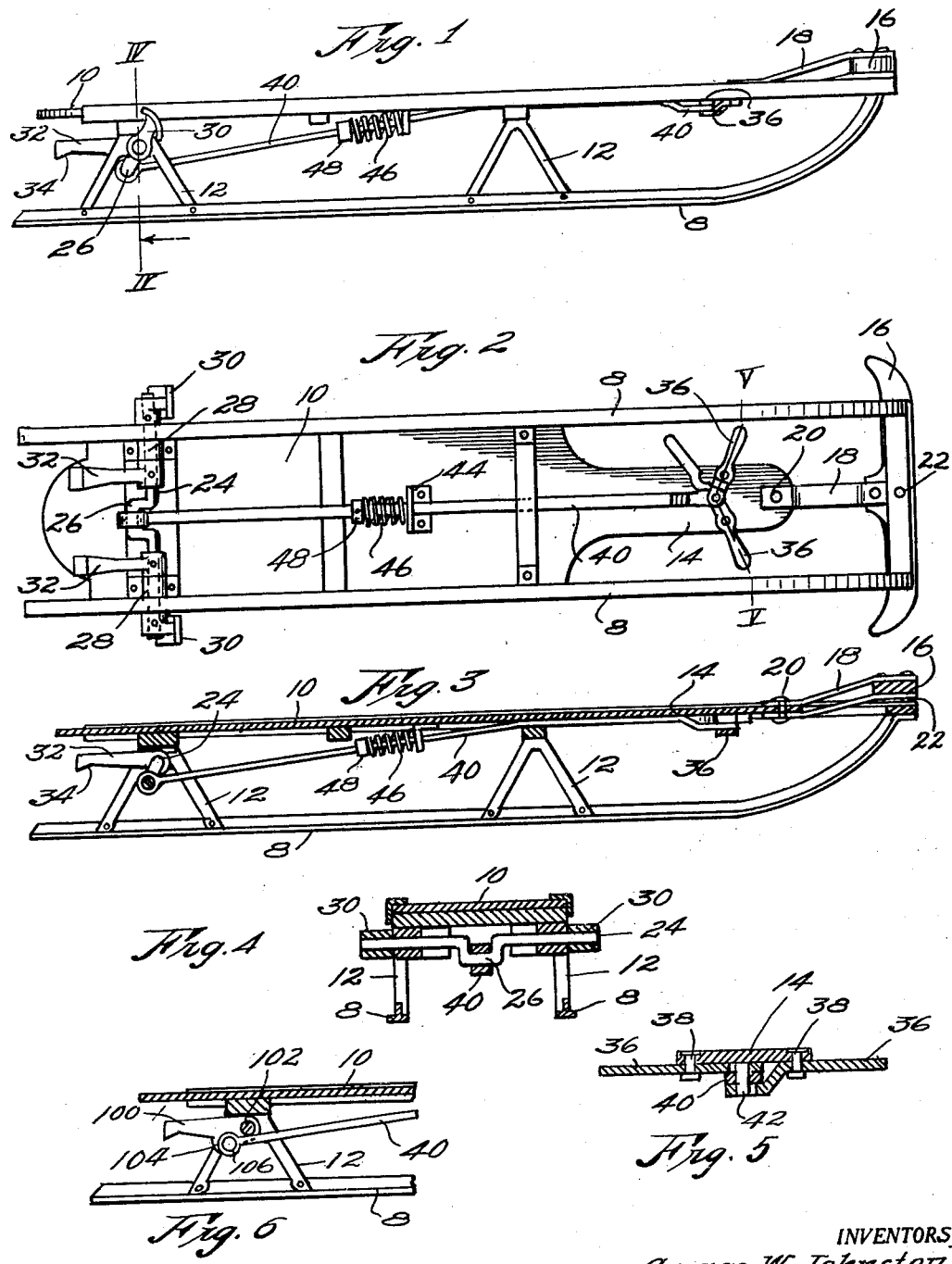
INVENTORS,
George W. Johnston
Samuel Muchnik
BY
Harvey E. Hamilton
ATTORNEYS.

Patented Mar. 14, 1933

1,901,302

UNITED STATES PATENT OFFICE

GEORGE W. JOHNSTON AND SAMUEL MUCHNIK, OF ST. JOSEPH, MISSOURI; SAID JOHNSTON ASSIGNOR TO SAID MUCHNIK

SLED BRAKE

Application filed July 20, 1931. Serial No. 551,870.

This invention relates to braking apparatus for sleds and has for a primary object, provision of effective, strong, durable and neat appearing brake system which may be built into a sled as the same is manufactured or applied to a previously constructed sled without altering the same and with but very little expense.

One of the objects of the instant invention is the contemplation of a sled brake which comprises parts disposed wholly beneath the platform of the sled, or at least so removed therefrom that the platform is not obstructed nor hampered by objectionable projections which tend to render the sled dangerous when in use.

A yet further object of the present invention is to provide braking apparatus for sleds which may be operated by either or both of the hands or feet of the rider; means being provided for yieldably maintaining the grippers of the brake apparatus in an inoperative position.

A still further object of this invention is to provide brake apparatus for sleds known to the trade as "Flexible Flyers"; such sleds having a platform provided with a laterally extending neck to each side of which is projected operating handles for moving the brake parts to the operative position.

Minor objects of this invention will appear during the course of the detailed specifications, wherein the preferred embodiment of the same is set forth; such form of the invention is illustrated in the accompanying drawing, wherein:

Figure 1 is a side elevation of a sled equipped with braking apparatus constructed in accordance with this invention.

Fig. 2 is an inverted plan view of the same.

Fig. 3 is a longitudinal, central, cross section taken vertically through the sled as illustrated in Fig. 1.

Fig. 4 is a vertical cross section taken along line IV—IV of Fig. 1.

Fig. 5 is a cross section through the bed of the sled, taken on line V—V of Fig. 2, and, Fig. 6 is a modified form of the invention illustrating a different manner of joining the connecting rod and grippers.

Referring to the preferred form of the invention as shown in Figs. 1 to 5 inclusive, and employing like reference characters to designate similar parts throughout these several views, 8 indicates the two parallel runners of the well known type of sled which is also provided with a platform 10 supported in an elevated position above runners 8 by standards 12 to provide a space between platform 10 and the bottom of runners 8 sufficient to unobstructedly receive the component parts of the braking apparatus contemplated by this invention.

The platform 10 of this type of sled presents a longitudinally and forwardly extending neck 14, narrower than bed 10 and joined to a transverse guide bar 16 by links 18 which impart movement to runners 8 through the pivotal connection 20 in a manner well known in the sled making art. Movement on the part of guide bar 16 is about pin 22 and such movement flexes or bends runners 8 to direct the forward movement of the sled in the desired direction.

The space between the sides of neck 14 and runners 8 permits of easy access to the hereinafter described operating handles which are positioned at this point as a matter of extreme convenience to the operator of the sled. With particular reference at this time to the brake structure itself, the same includes a transverse shaft 24 offset as at 26, and journaled in bearings 28 rigidly secured beneath platform 10 near the rear end of the sled. Shaft 24 extends beyond the sides of platform 10 where a foot pedal 30 is secured in rigid relation so that pressure on foot pedal 30 or both of the same will rotate shaft 24. A plurality of grippers 32 are mounted upon shaft 24 to move therewith and each gripper is formed at the free end thereof to present a hook 34 which digs into the snow or ice when shaft 24 is turned to lower grippers 32.

Foot pedals 30 do not project above the plane of platform 10 and are angled forwardly as shown in Fig. 1, whereby they might be readily engaged by the foot of the sled rider. In addition to the means for moving grippers 32 to the operative position by the foot, hand engaging handles 36 are presented adjacent the forward end of the sled and near enough to guide bar 16 where they may be engaged simultaneously with guide bar 16 without the rider shifting his position.

As before set down, neck 14 is comparatively narrow and it is the space between neck 14 and runners 8 that is occupied by handles 36, each of which is pivotally pinned as at 38 to neck 14 as clearly shown in Fig. 5. Handles 36 overlap and engage above and below respectively, the forward end of a longitudinal connecting rod 40, disposed along beneath platform 10 as shown in Fig. 3 to engage offset 26 of shaft 24. A pintle 42 establishes operative connection between rod 40 and handles 36, and a bracket 44 attached to the under side of platform 10, slidably supports rod 40. Referring to Fig. 2, it will be noted that lower lever 36 has a projection extending diametrically opposite therefrom which is adapted to be utilized as a handle which, when moved forwardly, will cause the grippers to be moved downwardly to the operating position.

The entire mechanism is maintained in inoperative non-braking position by a yieldable member in the form of a spring 46 stationed close to bracket 44 and between the same and a collar 48 mounted upon rod 40. Spring 46 may be coiled about rod 40 or attached thereto in any operative fashion so long as it performs the function of yieldably maintaining the parts of the brake in that position illustrated in the drawing.

The modified showing of the invention illustrated in Fig. 6 provides for a direct attachment between rod 40 and a different type of gripper 100. Transverse rod 102 in this instance need not be offset, the throw of gripper 100 being provided for through the attachment of rod 40 to projection 104, integral with gripper 100. A pin 106 pivotally interconnects gripper 100 and rod 40.

The operation of a sled brake embodying the broad concepts of this invention has been made clear throughout the specification.

Having thus described the invention, what is claimed as new and desired to be covered by Letters Patent is:

1. The combination with a sled having a runner-supported bed and a longitudinally extending neck forming a part of said bed, of braking apparatus comprising a transverse shaft; a plurality of gripper members on said shaft; a connecting rod reciprocably mounted beneath said bed; and laterally extending operating handles joining said connecting rod beneath said neck said handles projecting horizontally to positions between said neck and runners.

2. The combination with a sled having a runner-supported bed and a longitudinally extending neck forming a part of said bed, of braking apparatus comprising a transverse shaft; a plurality of gripper members on said shaft; a connecting rod reciprocably mounted beneath said bed; a laterally extending operating handle joining said connecting rod beneath said neck and projecting outwardly toward a runner on each side respectively of said neck, and means mounted beneath the said bed for yieldably maintaining said grippers in the inoperative position.

3. In combination with a sled having runners and an elevated platform, of braking apparatus comprising a transverse shaft adjacent one end of said platform; a gripper mounted on said shaft; a pair of laterally extending operating handles adjacent the opposite end of said platform; and a rod operatively connecting said shaft and handles disposed longitudinally of the platform therebeneath, said handles each being pivotally joined to said platform at independent, spaced apart points and joining the rod between said points.

4. In combination with a sled having runners and an elevated platform, of braking apparatus comprising a transverse shaft adjacent one end of said platform; grippers mounted on said shaft; a pair of laterally extending operating handles adjacent the opposite end of said platform; a rod connecting said shaft and handles beneath the platform; and means intermediate the shaft and handles to yieldably maintain said grippers in the inoperative position, said pair of handles overlapping beneath the platform and joining the said rod at their overlapping portion.

5. In combination with a sled having runners and an elevated platform, of braking apparatus comprising a transverse shaft adjacent one end of said platform; grippers mounted on said shaft; a pair of laterally extending operating handles adjacent the opposite end of said platform; a rod connecting said shaft and handles beneath the platform; means intermediate the shaft and handles to yieldably maintain said grippers in the inoperative position; and a foot pedal at each end respectively of said shaft spaced outwardly from the side of said platform.

6. In a sled, a pair of spaced apart runners; an elevated platform between said runners; gripper members beneath said platform; and mean to move said grippers comprising a pair of oppositely directed handles, spaced apart pivotal points supporting said handles to said platform in overlapped relation in a horizontal plane, a pivotal connection interconnecting the overlapped portions of said handles, and a bar interconnecting said last mentioned pivotal connection and the said grippers.

In testimony whereof, we hereunto affix our signatures.

GEORGE W. JOHNSTON.
SAMUEL MUCHNIK.